US012586923B2

(12) United States Patent
Sharma et al.

(10) Patent No.: US 12,586,923 B2
(45) Date of Patent: Mar. 24, 2026

(54) ADDITIVELY MANUFACTURED ANTENNA SYSTEM FOR NEAR EARTH AND DEEP SPACE APPLICATIONS

(71) Applicant: The Johns Hopkins University, Baltimore, MD (US)

(72) Inventors: Avinash Sharma, Laurel, MD (US); Carl L. Carpenter, Annapolis, MD (US); Steven R. Szczesniak, Columbia, MD (US); David M. Lee, Hanover, MD (US); Andrew M. Lennon, Ellicott City, MD (US); Walter R. Zimbeck, Annapolis, MD (US)

(73) Assignee: The Johns Hopkins University, Baltimore, MD (US)

(*) Notice: Subject to any disclaimer, the term of this patent is extended or adjusted under 35 U.S.C. 154(b) by 104 days.

(21) Appl. No.: 18/504,722

(22) Filed: Nov. 8, 2023

(65) Prior Publication Data

US 2024/0235054 A1 Jul. 11, 2024

Related U.S. Application Data

(60) Provisional application No. 63/438,137, filed on Jan. 10, 2023.

(51) Int. Cl.
*H01Q 21/00* (2006.01)
*H01Q 1/36* (2006.01)

(52) U.S. Cl.
CPC ......... *H01Q 21/0087* (2013.01); *H01Q 1/364* (2013.01)

(58) Field of Classification Search
CPC ............... H01Q 21/0087; H01Q 1/364; H01Q 13/0266; H01Q 13/0283
See application file for complete search history.

(56) References Cited

U.S. PATENT DOCUMENTS

| | | | | |
|---|---|---|---|---|
| 11,742,589 | B2 | 8/2023 | Menargues Gomez et al. | |
| 2015/0107474 | A1* | 4/2015 | Ramakrishnan ....... | H01Q 1/364 101/483 |
| 2016/0301430 | A1* | 10/2016 | Mohamadi .......... | C23C 18/1653 |

(Continued)

FOREIGN PATENT DOCUMENTS

| | | | | |
|---|---|---|---|---|
| WO | WO-2022019840 A1 * | 1/2022 | ............. | H01P 1/161 |

OTHER PUBLICATIONS

Sharma A., "3D Metal Printed Broadband X-Band Septum Polarizer", IEEE 2021 (Year: 2021).*

(Continued)

*Primary Examiner* — Jeffrey T Carley
*Assistant Examiner* — Jose K Abraham
(74) *Attorney, Agent, or Firm* — Sung T. Kim

(57) ABSTRACT

A process for fabricating an antenna system for near Earth and Deep Space applications includes additively manufacturing an aluminum alloy powder feedstock on a build plate to form a monolithic choke ring horn antenna and a septum polarizer system layer by layer; exposing the monolithic choke ring horn antenna and the septum polarizer system on the build plate to a heat treatment process; coating nickel onto surfaces defining the monolithic choke ring horn antenna and the septum polarizer at a thickness effective to reduce surface roughness; and coating gold onto the nickel coating at a thickness effective to reduce radiofrequency loss when in use.

13 Claims, 4 Drawing Sheets

(56) References Cited

U.S. PATENT DOCUMENTS

| | | | | |
|---|---|---|---|---|
| 2017/0077610 | A1* | 3/2017 | Bongard | H01Q 13/0233 |
| 2018/0065186 | A1* | 3/2018 | Cullinan | H01L 23/4985 |
| 2019/0190161 | A1* | 6/2019 | Hollenbeck | H01Q 15/242 |
| 2019/0291186 | A1* | 9/2019 | Aston | H01Q 9/22 |
| 2021/0362230 | A1 | 11/2021 | Aston et al. | |

OTHER PUBLICATIONS

Dixit, N., et.al., "Improving surface roughness of the 3D printed part using electroless plating", J of Materials, 233, 5, p. 942-954, 2019 (Year: 2019).*

Cullen, et al. "Effects of Surface Finish on High-Frequency Signal Loss Using Various Substrate Materials" Circuitree-Campbell—14 (2001): 80-80 (Year: 2001).*

SMC Standard SMC-S-010 (Year: 2009).*

Xu and Huang, "Wireless interrogation of antenna sensors for strain monitoring", Sensors and Smart Structures Technologies for Civil, Mechanical, and Aerospace Systems 2012, (Year: 2012).*

Olakanmi et.al., A review on selective laser sintering/melting (SLS/SLM) of aluminum alloy powders: Processing, microstructure, and properties, Progress in Materials Science, 74, 401-477, 2015 (Year: 2015).*

Avinash Sharma et al., 3D Metal Printed Ka-Band Quad-Ridge Horn Antenna, 2022 IEEE International Symposium on Antennas and Propagation and USNC-URSI Radio Science Meeting, pp. 1986-1987.

Avinash Sharma et al., 3D Metal Printed Broadband X-Band Septum Polarizer, 2021 IEEE International Symposium on Antennas and Propagation and USNC-URSI Radio Science Meeting, pp. 1429-1430.

* cited by examiner

ADDITIVELY MANUFACTURED ANTENNA SYSTEM FOR NEAR EARTH AND DEEP SPACE APPLICATIONS

CROSS-REFERENCE TO RELATED APPLICATIONS

This application claims the benefit of U.S. Provisional Patent Application Ser. No. 63/438,137, filed on Jan. 10, 2023, which is expressly incorporated by reference herein in its entirety.

STATEMENT REGARDING FEDERALLY SPONSORED RESEARCH OR DEVELOPMENT

This invention was made with Government support under Contract No. NNN06AA01C awarded by the National Aeronautics and Space Administration. The Government has certain rights in the invention.

BACKGROUND

The present disclosure generally relates to antenna systems for near Earth and Deep Space applications. More particularly, the present disclosure relates to additively manufactured choke ring horn antenna systems including septum polarizers.

Near Earth and Deep Space exploration satellite systems require antenna systems for transmitting data from the satellite back to a ground station located on the Earth. For example, the United States (US) National Aeronautics and Space Administration (NASA) is planning the development and launching of an Interstellar Mapping and Acceleration Probe (IMAP) sometime around the year 2025. The IMAP spacecraft is a simple sun-pointed spinner that will be placed in orbit about the Sun-Earth L1 point hosting ten instruments that will take observations needed to investigate a variety of mission objectives. The primary mission objectives are to improve understanding of the composition and properties of the local interstellar medium (LISM); advance understanding of the temporal and spatial evolution of the boundary region in which the solar wind and the interstellar medium interact; identify and advance the understanding of processes related to the interactions of the magnetic field of the Sun and the LISM; and identify and advance understanding of particle injection and acceleration processes near the Sun, in the heliosphere and heliosheath.

Real-time in-situ data collected during the mission needs to be continuously transmitted over various bands (e.g., Ka-band, X-band, or the like) at a high data rate. In this regard, the IMAP spacecraft will be equipped with antenna systems including a configuration of antenna feeds that transmit and/or receive circularly polarized uplink and/or downlink signals. One such antenna system being considered is a circularly polarized X-Band choke ring horn antenna, which is used due to its isoflux radiation characteristic and high power handling capability. Current processes for fabricating the choked ring horn antenna of this type are highly complex, involving several steps and components, resulting in high cost and prolonged scheduling.

SUMMARY

Disclosed herein are additively manufactured antenna systems for near Earth and Deep Space applications and processes for fabricating monolithic antenna systems.

In one or more embodiments, a process for fabricating an antenna system for near Earth and Deep Space applications includes additively manufacturing an aluminum alloy powder feedstock on a build plate to form a monolithic choke ring horn antenna and a septum polarizer system layer by layer; exposing the monolithic choke ring horn antenna and the septum polarizer system on the build plate to a heat treatment process; coating nickel onto surfaces defining the monolithic choke ring horn antenna and the septum polarizer at a thickness effective to reduce surface roughness; and coating gold onto the nickel coating at a thickness effective to reduce radiofrequency loss when in use.

In one or more other embodiments, a process for fabricating an antenna system for near Earth and Deep Space applications includes additively manufacturing an aluminum alloy powder feedstock on a build plate at a 45-degree angle to form a monolithic choke ring horn antenna and a septum polarizer system and one or more tensile coupons layer by layer, wherein the one or more tensile coupons are coupled to the build plate and the monolithic choke ring horn antenna and the septum polarizer system; exposing the monolithic choke ring horn antenna and the septum polarizer system and the one or more tensile coupons on the build plate to a heat treatment process; removing the tensile coupons from the build plate and the monolithic choke ring horn antenna and the septum polarizer system; coating nickel onto surfaces defining the monolithic choke ring horn antenna and the septum polarizer system at a thickness effective to reduce surface roughness; and coating gold onto the nickel coating at a thickness effective to reduce radiofrequency loss when in use.

In one or more embodiments, an antenna system for near Earth and Deep Space applications includes a monolithic choke ring horn antenna and a septum polarizer system configured for attachment to a spacecraft; a nickel coating on surfaces thereof in an amount to decrease surface roughness; and a gold plating on the nickel coating in an amount effective to reduce radiofrequency loss when in use.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Example embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

PRIOR ART

PRIOR ART

Figure 3:
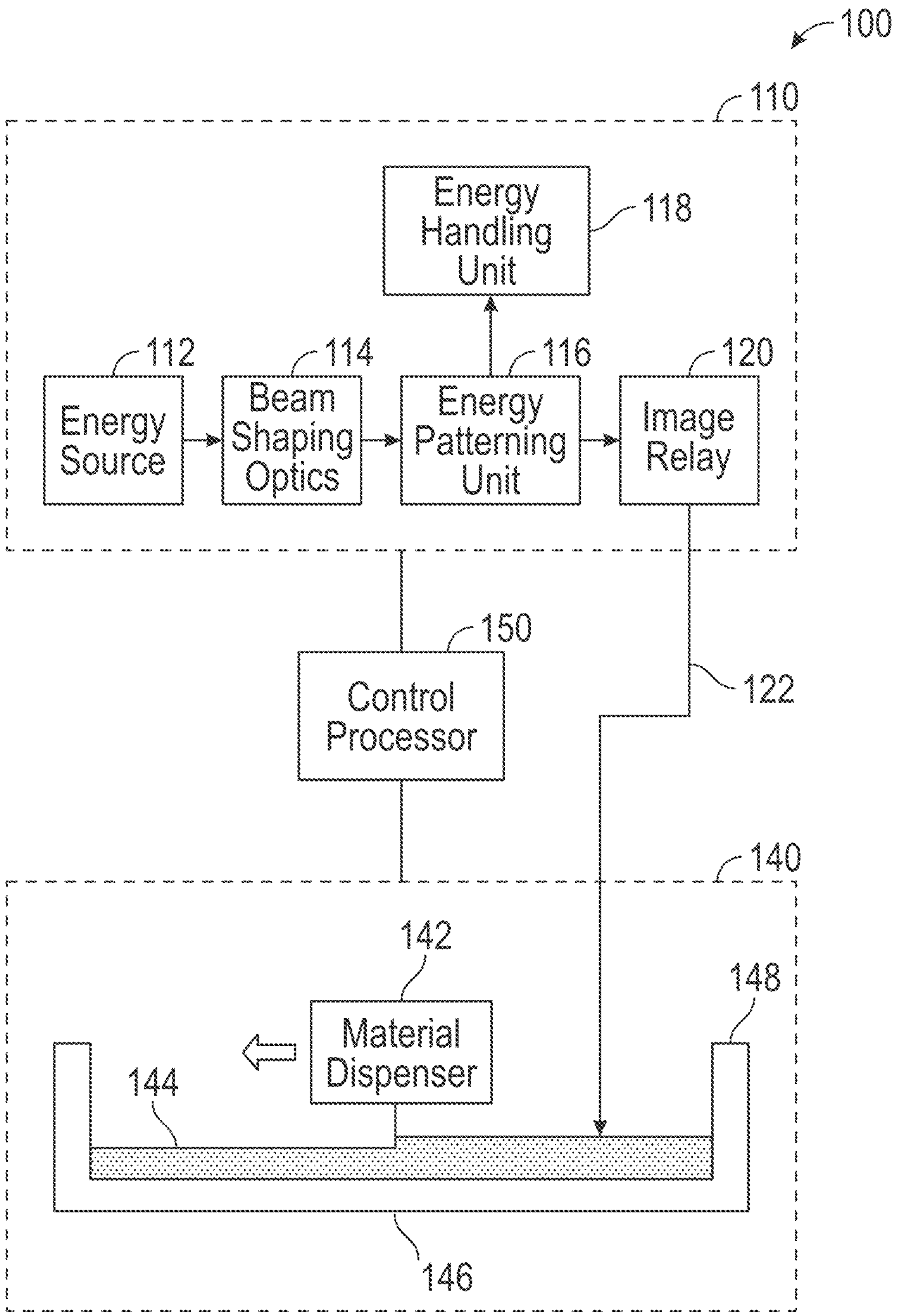
FIG. 3 (Prior Art)
Figure 4:
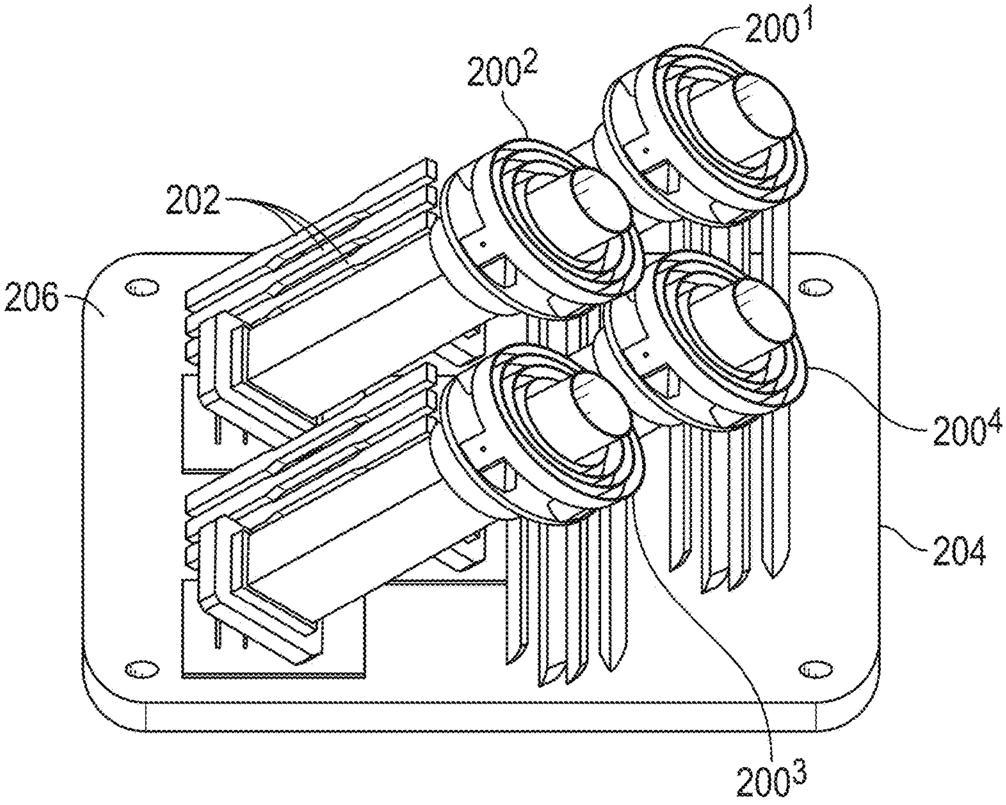
Figure 5:
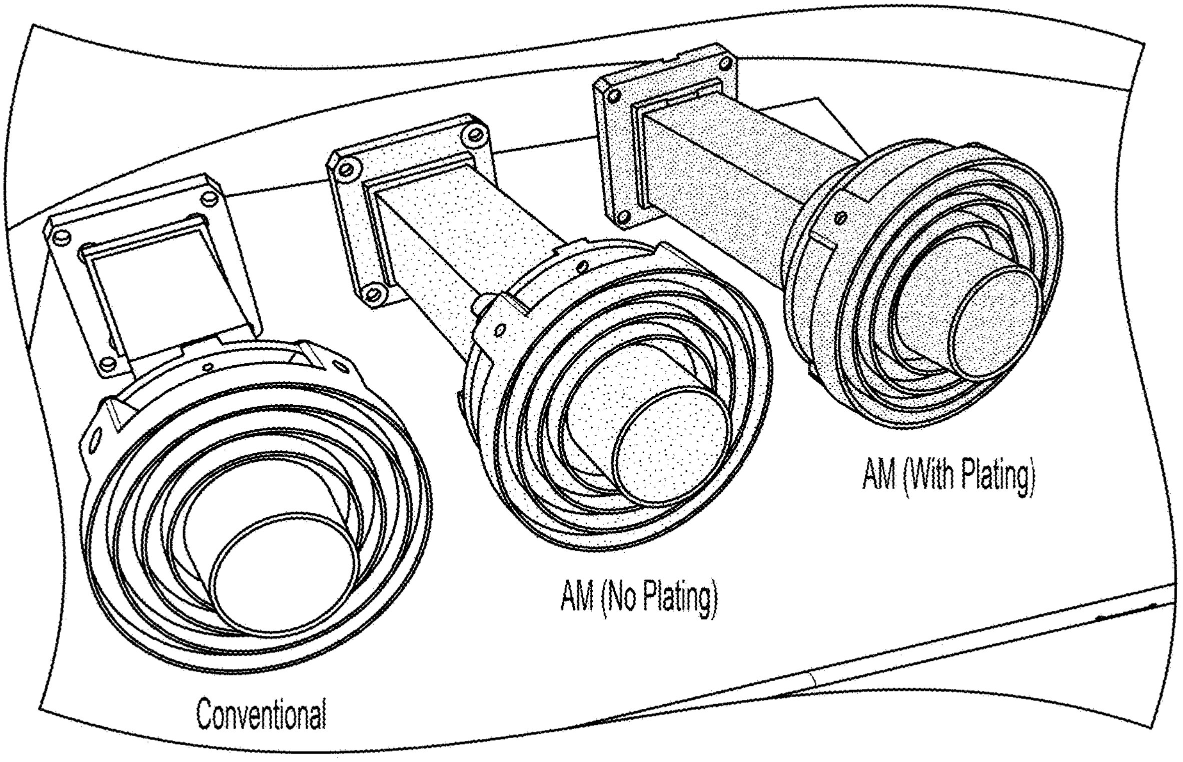
Figure 6:
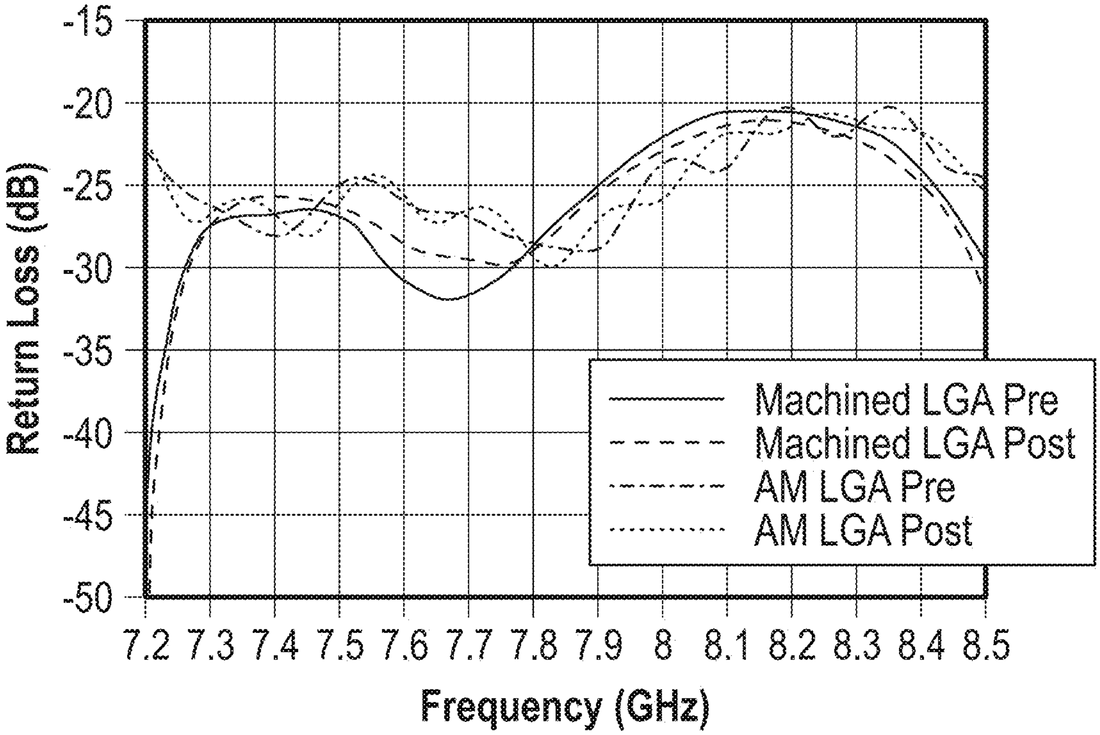
Figure 7:
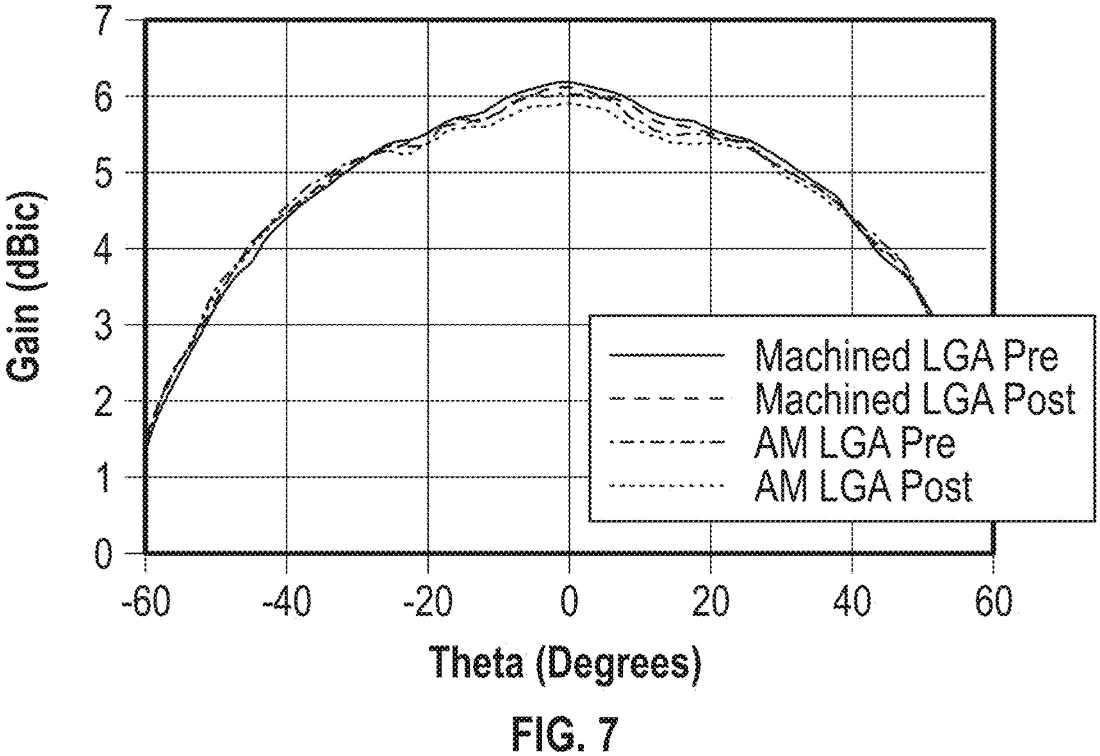

PRIOR ART FIG. 3 schematically illustrates an exemplary additive manufacturing system;

FIG. 4 illustrates four additively manufactured choke ring horn antenna and septum polarizer systems and tensile coupons for each system on a build plate in accordance with one or more embodiments of the present disclosure;

FIG. 5 illustrates a conventional choke ring horn antenna and septum polarizer system compared to additively manufactured choke ring antenna and polarizers with and without plating in accordance with one or more embodiments of the present disclosure FIG. 6 graphically illustrates pre- and post-return loss comparisons as a function of frequency for a conventional and an additively manufactured choke ring horn antenna and septum polarizer in accordance with one or more embodiments of the present disclosure; and FIG. 7 graphically illustrates pre- and post-gain comparisons of gain as a function of the angle of frequency for a conventional and an additively manufactured choke ring horn antenna and septum polarizer in accordance with one or more embodiments of the present disclosure.

DETAILED DESCRIPTION

The present disclosure is generally directed to choke ring horn antenna and septum polarizer systems ("antenna systems") and processes for manufacturing the antenna systems, which are suitable for transmitting and receiving X-band frequencies for near-Earth and Deep Space applications. More particularly, the processes generally include additively manufacturing the choke ring horn antenna with the septum polarizer system as a single-piece monolithic structure, which is then subjected to a heat treatment process and an electroless plating process to produce plated monolithic antenna systems suitable for use in near Earth and Deep Space applications. Optionally, simultaneous with the additive manufacture of the choke ring horn antenna and septum polarizer system, tensile coupons having the same composition and manufactured with the same process parameters and feedstock as the choke ring horn antenna systems are simultaneously produced in an XY or YZ plane relative to a build plate in accordance with ASTM E8M and subsequently detached from the build plate and from the choke ring horn antenna and the septum polarizer and tested. The tensile coupons can be utilized to provide accurate tensile strength information, e.g., yield stress, ultimate stress, and peak strain, as it relates to the additively manufactured choke ring horn antenna and septum polarizer system. Advantageously, the additively manufactured single-piece antenna systems including the septum polarizer have similar mechanical properties and performance characteristics compared to conventionally manufactured multi-piece machined construction of the choke ring horn antenna and the septum polarizer yet are a fraction of the cost and time to manufacture. The additively manufactured single-piece antenna systems overcome many of the problems associated with multi-piece construction of the antenna system in terms of cost and manufacturing efficiency.

In the present disclosure, conventional techniques related to additive manufacturing processes for forming three-dimensional metal articles such as the additively manufactured antenna system may or may not be described in detail herein. Likewise, conventional techniques for forming the prior art multipiece antenna systems may or may not be described in detail herein. Moreover, the various tasks and process steps described herein can be incorporated into a more comprehensive procedure or process having additional steps or functionality not described in detail herein. Various steps in the additive manufacture of three-dimensional metal articles are well known and so, in the interest of brevity, many conventional steps will only be mentioned briefly herein or will be omitted entirely without providing the well-known process details.

For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof. Additionally, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

Spatially relative terms, e.g., "beneath," "below," "lower," "above," "upper," and the like, can be used herein for ease of description to describe one element or feature's relationship to another element(s) or feature(s) as illustrated in the figures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

The additive manufacturing process in accordance with the present disclosure is not intended to be limited. By way of example, reference will be made to a selective laser melting (SLM) process, also referred to as laser bed powder fusion or direct metal laser melting, that uses a bed of a metal powder with a source of heat to create the additively manufactured antenna systems and tensile coupons layer by layer on a build plate utilizing support structure during the build.

Figure 1:
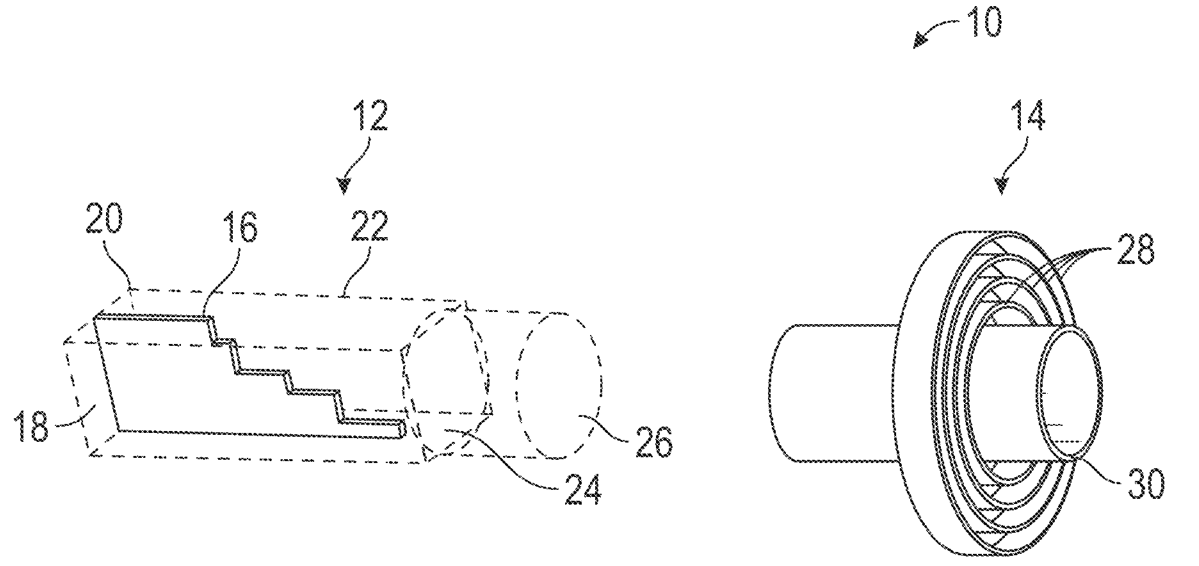
FIG. 1 (Prior Art)
FIG. 1 illustrates a conventional choked ring horn antenna and septum polarizer system.

Referring now to PRIOR ART FIG. 1, there is depicted a conventional choke ring antenna and septum polarizer system 10, which generally includes a choke ring horn antenna 14 coupled to a septum polarizer 12, both of which are formed of an aluminum alloy. The septum polarizer 12 generally includes an internal stepped septum 16 within a rectangular-shaped housing 22 including a left linearly polarized rectangular input port 18, a right linearly polarized rectangular input port 20, and a square-shaped output port 24, which transitions the inputs from the linear polarized input ports 18, 20 to a circular port 26 that is configured to feed the cylindrical choke ring horn antenna 14. The square-shaped output port 24 supports two degenerate modes from the input ports 18, 20 appropriately phased via the stepped septum 16. The stepped septum 16 can be configured to appropriately phase the degenerate modes in a known manner and provide impedance matching over an X-band frequency range of 7190 to 8500 megahertz (MHz). The cylindrical choke ring horn antenna 14 is coupled to the circular port 26 and is an open cylindrical waveguide including a number of concentric conductive cylinders 28 around a central antenna 30.

Figure 2:
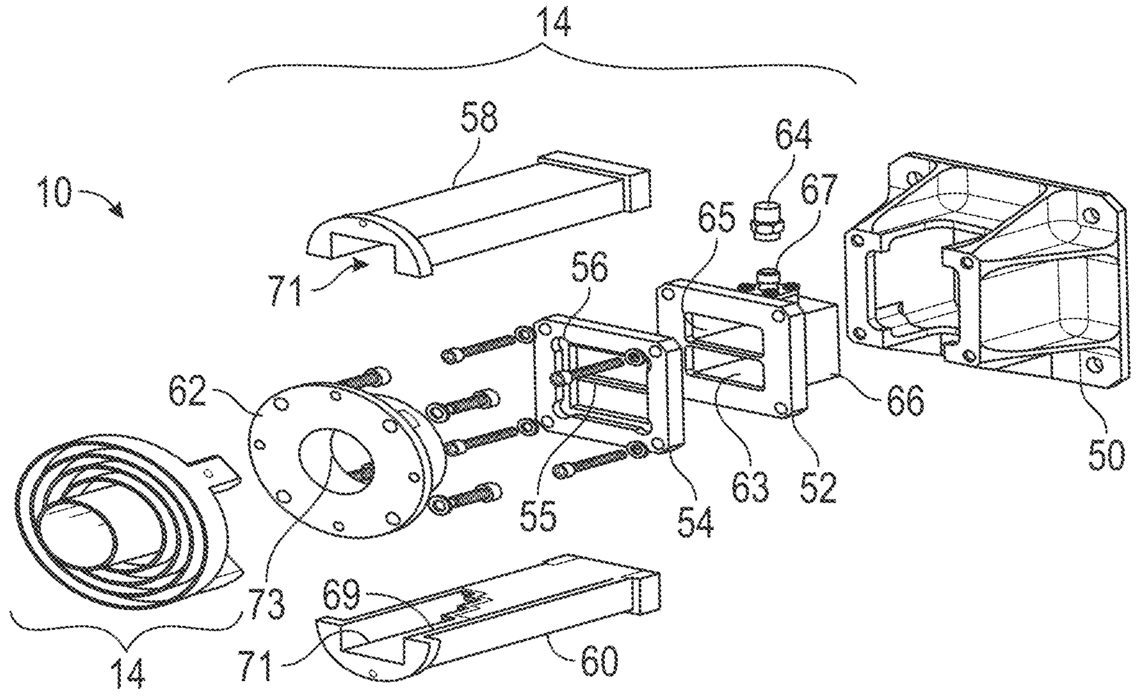
FIG. 2 (Prior Art)
FIG. 2 illustrates an exploded perspective view of a conventionally fabricated choke ring horn antenna and septum polarizer system.

Fabrication of the prior art choke ring horn antenna and the septum polarizer systems is fairly complex and time consuming as noted above. PRIOR ART FIG. 2 illustrates an exploded perspective view of the various aluminum alloy components that are required to be machined, qualified, and assembled to form the choke ring horn antenna and the septum polarizer system 10. The choke ring horn antenna and septum polarizer system 10 is configured to be coupled to a machined bracket 50 via an adaptor 52 for attachment of the choke ring horn antenna and polarizer 10 to an object, e.g., the spacecraft. The choke ring horn antenna and septum polarizer system 10 includes a polarizer flange 54 configured for attachment to the adaptor 52. The adaptor 52 generally includes a housing 66 including two rectangular shaped chambers 63, 65 defining the input ports and a conduit opening 67 for attachment with a coupler 64 for the electronics needed for electronic communication with the spacecraft and data transfer.

The polarizer flange 54 includes a bifurcated square shaped opening 55 and a recessed shoulder portion 56 for seating an assembled polarizer housing, which is of a two-piece construction 58, 60, each half including a portion of the stepped septum 69 formed therein. The two halves 58, 60 include an open end 71 defined by a square shaped opening when attached to each other. A circular flange 62 is attached to the open end to provide a transition from a square shaped opening to a circular shaped opening 73. A feed horn 14 is machined and is coupled to the circular flange 62. The different machined components are formed from an aluminum alloy, which depending on the particular component is specified to be A6061 aluminum alloy or A6063 aluminum alloy, both of which include magnesium and silicon as the major alloying elements.

The machined components are individually qualified and then subjected to a tempering process, i.e., a heat treatment process, to provide the desired physical and mechanical properties. The tempering process involves heating the material to a specific temperature, holding it there for a certain period of time, and then cooling it down slowly. Typically, the tempering process is a T6 tempering process or a variation of the T6 tempering process.

Once tempered, the different machined components are bolted together and then subjected to dip brazing, which is a brazing process that facilitates the joining or brazing of several parts or pieces in the desired manner simultaneously. The dip brazing process uses flux and a filler metal. When the brazing assembly is dipped in the hot salt bath, the flux melts and dissolves in the salt bath and allows the filler metal to melt and fill any exposed joints by capillary action.

By way of example, the aluminum machine components can be dip brazed with a combination of aluminum and silicon as the filler metal. The preheating of the brazing assembly is done at around 550° C. (1022° F.) and dip brazing at around 590° C. (1094° F.). One of the problems associated with dip brazing is with the removal of excess dip braze material at critical internal sections since the removal process can affect radiofrequency performance for the antenna. For example, there are challenges with removal of the dip brazing material along the septum, and at the flange corners, which requires post processing to remove the excess dip braze material from these surfaces.

An alodine coating is then provided on the surfaces, which generally include passivating the surfaces with a chemical such as chromic acid, which reacts with the aluminum to form a thin oxide/hydroxide layer. The alodine coating provides corrosion resistance and can improve adhesion of any additional coatings that may be desired.

Unlike the conventional approach described above, the present disclosure employs an additive manufacturing (AM) process to fabricate the choke ring horn antenna and polarizer system as a single-piece. AM processes generally include a sequential layer by layer build-up of a three-dimensional object of any shape from a design. In a typical AM process, a two-dimensional image of a first layer of metal is formed and subsequent layers are then added one by one until such time a three-dimensional article is formed. Typically, the three-dimensional article is fabricated using a computer aided design (CAD) model. A particular type of AM process uses an energy beam, for example, an electron beam or electromagnetic radiation such as a laser beam, to thermally create each layer of the article in which particles of the powder material are bonded together and, where indicated, bonded to the underlying layer.

In AM processing of metals, a typical feedstock is a powdered metal or wire composition of one or more metals, which is sintered or fully melted by an energy input provided by a laser or electron beam. As a result, the powdered metal composition is transformed layer by layer into a solid three-dimensional part of nearly any geometry. The most popular AM processes for metals include laser beam melting, electron beam melting, and laser beam deposition. During AM processing, the metal powder or wire is subjected to a complex thermal cycle that includes rapid heating above the melting temperature of the respective metal due to energy absorption from the laser (or electron beam) and its subsequent transformation into heat to form a molten metal followed by rapid solidification after the heat source has moved on.

Prior art FIG. 3 shows an exemplary additive manufacturing system 100 having an energy patterning system 110 with an energy source 112 that can direct one or more continuous or pulsed energy beam(s) toward beam shaping optics 114. After shaping, if necessary, the beam is patterned by an energy patterning unit 116, with generally some energy being directed to a rejected energy handling unit 118. Patterned energy is relayed by image relay 120 toward an article processing unit 140, typically as a two-dimensional image 122 focused near a bed 146. The bed 146 (with optional walls 148) can form a chamber containing material 144 dispensed by material dispenser 142. Patterned energy, directed by the image relay 120, can melt, fuse, sinter, amalgamate, change crystal structure, influence stress patterns, or otherwise chemically or physically modify the dispensed layer of material 144 (such as a metal powder) to form structures with desired properties.

Energy source 112 generates photon (light), electron, ion, or other suitable energy beams or fluxes capable of being directed, shaped, and patterned. Multiple energy sources can be used in combination. The energy source 112 can include lasers, electron beams, or ion beams. Energy patterning unit 116 can include static or dynamic energy patterning elements. For example, photon, electron, or ion beams can be blocked by masks with fixed or movable elements Rejected energy handling unit 118 may be used to disperse, redirect, or utilize energy not patterned and passed through the energy pattern image relay 120. Image relay 120 receives a patterned image (typically two-dimensional) from the energy patterning unit 116 and guides it toward the article processing unit 140. Article processing unit 140 can include a walled chamber having walls 148 and bed 146, and a material dispenser 142 for distributing material. The material dispenser 142 can distribute, remove, mix, provide gradations or changes in material type or particle size, or adjust layer thickness of material. Control processor 150 can be connected and programmed to control any components of the additive manufacturing system 100. The control processor 150 is provided with an interface to allow input of manufacturing instructions. For example, the control processor 150 may control the operation of the energy source 112 such as its translatable position; energy beam characteristic(s), including their respective beam patterns, pulsing characteristics, positional relationships, power levels, power densities, exposure times, point distance, velocity, or any combination thereof.

In the various commercially available AM systems, the parameters defining the energy beam can vary widely. Generally, the power of these additive manufacturing systems can be adjusted from about 10 to about 5000 W and will generally depend on the type of laser, the scanning velocity (which defines the exposure time) can be adjusted from about 100 mm/s to about 10,000 mm/s, hatch spacing (i.e., distance between adjacent scan lines) can be adjusted from about 10 μm to about 5000 μm, the energy density can range from about 10 J/mm$^3$ to 10,000 J/mm$^3$, the point distance can be in a range of about 10 μm to about 5000 μm, and layer thickness can be adjusted from about 10 μm to about 5,000 μm.

An exemplary additive manufacturing process for fabricating the choke ring horn antenna and septum polarizer system included loading the system with a powder feedstock of a desired aluminum alloy composition (e.g., A6061-RAM2 from Elementum) and preheating the build plate 106 to a temperature of about 130° C. within a chamber of an additive manufacturing system such as an AM 400 system available from Renishaw Inc., which helps reduce thermally-induced stress in the parts. Prior to loading the powder feedstock, various methods of pre-conditioning the powder may be employed to remove adsorbed moisture and improve flowability of the powder. Poor powder flowability can result in clogging of the dosing mechanism and inadequate dosing of layers resulting in short feeding and layer defects in the parts. Poor powder flowability can also result in a reduced and/or variable packing density within a fully-dosed layer. Low packing density can result in high levels of porosity defects in the laser melted parts. High moisture content in the powder can additionally result in undesirable porosity due to trapped water vapor and hydrogen gas in the laser melted parts. To remove adsorbed moisture from the powder prior to loading the powder in the feed hopper, the powder can be ball milled for up to 24 hours with desiccant packs. Alternatively, the powder to be used for a build can be loaded onto the build plate with the plate lowered to the bottom position, and the build plate heated to >100° C. with the build chamber sealed and purged with Argon to drive out any moisture that may be contained in the power feedstock. The argon purge of the chamber provided an oxygen content of less than about 2000 parts per million (ppm). The antenna system was then fabricated layer by layer from a CAD file at a layer thickness of 30 microns, a laser power setting of 214 Watts, an exposure time of 96 microseconds, a point distance of 88 microns, and a hatch spacing of 112 microns.

As shown in FIG. 4, four antenna systems 200$^{1-4}$ were simultaneously additively manufactured fabricated on the build plate 206 using the above parameters over a time period of about 24 hours, which is significantly faster than any conventional build process that can often occur over a period of weeks and/or months because of the numerous components that need to be machined and qualified as well the specialized processing needed by different vendors. Tensile coupons 202 for each antenna system 200$^{1-4}$ were also fabricated at the same time, which are generally have a dog-bone shape with dimensions in accordance with ASTM E8. The antenna systems 200$^{1-4}$ and tensile coupons 202 were each additively manufactured on the build plate 206 at angle of 45 degrees to reduce the amount of internal support structure 204 needed.

The additively manufactured antenna systems and tensile coupons were then subjected to a modified T6 heat treatment process while on the build plate to precipitation harden the aluminum alloy. The heat treatment process included two steps: a) solution treatment, and b) aging. In the first step, all of the components on the build plate including the antenna system and tensile coupons are heated at a ramp rate of 10° F. per minute from room temperature to about 932° F.±25° F. for 90 minutes and quenched in water to cool the aluminum alloy rapidly enough to prevent the alloying elements from precipitating on cooling. This results in a solid solution of magnesium, silicon, and other alloying elements in the aluminum alloy at room temperature, which is akin to a T4 temper.

In the second step, the antenna systems and tensile coupons attached to the build plate are heated at a rate of 10° F. to about 329° F., held for 24 hours, and followed by furnace cooling to room temperature, which forms ordered arrays of atoms in the aluminum matrix.

Instead of an alodine coating as utilized in conventional fabricating processes, the resulting surfaces of the additively manufactured antenna systems and tensile coupons are then plated to compensate for the surface roughness associated with additive manufacturing as opposed to machining. Standard surface roughness from a CNC is on the order of 3.2 μm (or 0.125 mils), whereas the surface roughness of the additively manufactured part without any additional processing is about 0.7 mils. The tensile coupons can be removed from the build plate via wire electrical discharge machining (EDM). The plating process included cleaning and preparing the surfaces of the aluminum alloy using a zincate process in accordance with ASTM B-253. Electroless nickel was then deposited at a thickness of about 200 to 300 microns per AMS-C-26074, Class 1 or AMS 2404 to fill the void depth produced during additive manufacturing followed by electroplating gold having a thickness equal to or greater than 100 microns, which is provided to reduce RF loss. The electrodeposition of the gold plate is in accordance with MIL-DTL-45204D, Type III, Grade A. Plating adhesion was tested by tape adhesion (without scribe) in accordance with ASTM 3559 as received and after TVAC testing. The density, i.e., porosity and cracks, was analyzed using X-ray computed tomography scans.

FIG. 5 pictorially illustrates a conventional multi-piece choke ring horn antenna and septum polarizer, the additively manufactured single-piece choke ring horn antenna and septum polarizer without plating, and the choke ring horn antenna and septum polarizer with gold plating. The additively manufactured single-piece choke ring horn antenna and septum polarizer without plating visually exhibited a rougher surface than the plated additively manufactured antenna system and can shed particles, which is not desirable for space applications since contamination and damage to the antenna and other systems can occur. The surface roughness can readily be measured using a coordinate measuring machine (CMM) and generally ranges from about 200 to 300 microns. A relatively thick layer of the electroless nickel and thinner layer of electrodeposited gold significantly reduces the surface roughness, prevents particle shedding, and results in minimal RF loss during use.

FIGS. 6 and 7 graphically illustrate pre- and post-environmental testing performance comparison between the additive manufactured antenna system and the conventional antenna system. The environmental testing included vibration testing (sine and random, in three axes), and TVAC testing. Specifically, the vibration test included a pre-sine survey (0.25 g from 5 to 2000 Hz), full level sine sweep (see Tables 1 and 2 for levels) followed by a 14.1 grms random vibration test (per NASA Technical Standard GSFC-STD-7000B—General Environmental Verification Standard (GEVS) for GSFC Flight Programs and Projects). These tests were performed on all three axes (x, y, and z). The random test ran for 2 minutes per axis. A final post-sine survey was conducted and compared with the pre-sine survey and advantageously showed no change in structural resonances.

TABLE 1

Sine Specification (Perpendicular to LGA Mounting Plane)

| | | Frequency | Level (displacement, Acceleration) |
|---|---|---|---|
| | | 1. 5 | 1. 0.63 |
| Axes | Z | 2. 22 | 2. 12 |
| Sweep | | 3. 26 | 3. 12 |
| # of Sweeps/Duration | 4 Octaves/minute | 4. 33 | 4. 1.25 |
| Abort Tolerances: | | 5. 100 | 5. 1.25 |
| | | 6. — | 6. — |

TABLE 2

Sine Specification (Parallel to LGA Mounting Plane)

| | | Frequency | Level (displacement, Acceleration) |
|---|---|---|---|
| | | 1. 5 | 1. 0.63 |
| Axes | X & Y | 2. 19 | 2. 9 |
| Sweep | | 3. 23 | 3. 9 |
| # of Sweeps/Duration | 4 Octaves/minute | 4. 30 | 4. 1.25 |
| Abort Tolerances: | | 5. 100 | 5. 1.25 |
| | | 6. — | 6. — |

The TVAC is a simulation of the conditions found in outer space such as vacuum, extreme temperature variations, and radiative thermal environment. The TVAC test included thermal cycling to the survival temperature range of −150° C. to +150° C. for 10 cycles under vacuum. In FIG. 6, differences between initial and final return loss as a function of frequency demonstrated minimal differences pre- and post-environmental testing as well as between the additively manufactured antenna system and the conventionally fabricated antenna system. Likewise, as shown in FIG. 7, pre- and post-environmental testing of the additively manufactured antenna system and the conventionally fabricated antenna system was negligible for gain as a function of directivity. In summary, the differences in performance between the additive manufactured antenna system and the conventional antenna system exhibited negligible degradation after the environmental tests, wherein the additively manufactured antenna system was similar.

The tensile coupons, fabricated at the same time as the antenna systems, were also tested in accordance with ASTM E8. Measurements including peak stress and ultimate tensile strength were within the margins specified by NASA. The results are shown in the Table 3 below. The measured values are slightly lower than the specifications, which is believed to be associated with moisture content of the powder feedstock. Further reduction of moisture content increased these tensile strengths indicating the need to store the powder feedstock a controlled environment.

TABLE 3

| Parameter | Measured | Datasheet |
|---|---|---|
| Peak Stress (MPa) | 277 | 297 |
| Ultimate Tensile Strength (MPa) | 293 | 331 |

Advantageously, the single-piece additive manufacturing of the choke ring horn antenna and polarizer system results in a more structurally sound antenna system when compared to the conventional multi-piece construction process since there are no dip brazed joints in the additively manufactured choke ring antenna and polarizer. Moreover, the time associated with additive manufacturing is minimal compared to the conventional fabrication methods that require numerous machined components and qualification of each component, dip brazing and removal of excess braze material at critical sections, and the like. Moreover, the cost is significantly greater with the conventional fabrication process than it is for the additive manufacturing process. Still further, it has been demonstrated that comparable performance to the conventionally manufactured antenna systems can be realized with the additive manufactured antenna system.

The gold plating process developed to eliminate particle shedding from the additively manufactured antenna. When conventional conversion coating was used on the additively manufactured antenna, particles and conversion coating were removed during a tape adhesion test. The nickel and gold plating allowed successful prevention of particle shedding, which is critical for near Earth and deep space satellites, which have a suite of sensitive instruments that could be damaged due to shed particles. The additively manufactured antenna system was also tested for outgassing in a vacuum environment (less than 1e-7 Torr) over −140 to +90° C. The measured outgassing is less than 1e-14 $g/cm^2/s$. Moreover, the gold plating process developed does not change absorptivity or emissivity over temperature, when compared to chromate conversion used on conventional aluminum antennas, or other types of plating, such as silver, which can tarnish. Complicated anti-tarnishing techniques are required for use with silver. Also, the gold plating does not change optical properties, as opposed to chemical conversion coating, which complicates the thermal analysis and design over the long-time space (e.g., over ten years) of deep space missions. The plating process also reduced the average surface roughness from about 0.7 mils to 0.25 mils. Finally, the plating process does not require additional post-processing steps, such as electro-polishing, which adds to complexity and fabrication time, but also causes changes to the critical dimensions of design.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A process for fabricating an antenna system for near Earth and Deep Space applications, the process comprising:

additively manufacturing an aluminum alloy powder feedstock on a build plate to form a monolithic choke ring horn antenna and a septum polarizer system layer by layer;

exposing the monolithic choke ring horn antenna and the septum polarizer system on the build plate to a heat treatment process by heating the monolithic choke ring horn antenna and the septum polarizer system on the build plate at an elevated temperature for a first period of time to form a solid solution of magnesium and silicon in the aluminum alloy followed by aging at a lower temperature than the elevated temperature for a second period of time to form ordered arrays of atoms in the aluminum alloy;

coating nickel onto surfaces of the monolithic choke ring horn antenna and of the septum polarizer at a thickness to reduce surface roughness; and coating gold onto the nickel coating at a thickness to reduce radiofrequency loss when in use.

2. The process of claim 1, wherein the nickel coating has a thickness greater than the gold coating.

3. The process of claim 1, wherein coating the nickel coating comprises an electroless nickel deposition process in accordance AMS-C-26074, Class 1.

4. The process of claim 1, wherein thickness of the nickel coating is 200 to 300 microns.

5. The process of claim 1, wherein the gold coating comprises an electrodeposition process in accordance with MIL-DTL-45204D, Type III, Class A.

6. The process of claim 1, wherein thickness of the gold coating is 100 microns.

7. The process of claim 1 further comprising treating the surfaces with zincate in accordance with ASTM B-253 prior to coating the nickel.

8. The process of claim 1, wherein the elevated temperature is 932° F.±25° F. and the first period of time for solution treatment is 90 minutes; and wherein the lower temperature is 329° F. and the second period of time for the aging is 24 hours.

9. The process of claim 1, further comprising simultaneously fabricating one or more tensile coupons in accordance with ASTM E8 for each one of the monolithic choke ring horn antenna and the septum polarizer system on the build plate.

10. The process of claim 1, wherein additively manufacturing the aluminum alloy powder feedstock on the build plate to form the monolithic choke ring horn antenna and the septum polarizer system layer by layer is at a 45-degree angle.

11. A process for fabricating an antenna system for near Earth and Deep Space applications, the process comprising:

additively manufacturing an aluminum alloy powder feedstock on a build plate at a 45-degree angle to form a monolithic choke ring horn antenna and a septum polarizer system and one or more tensile coupons layer by layer, wherein the one or more tensile coupons are coupled to the build plate and the monolithic choke ring horn antenna and the septum polarizer system;

exposing the monolithic choke ring horn antenna and the septum polarizer system and the one or more tensile coupons on the build plate to a heat treatment process by heating the monolithic choke ring horn antenna and the septum polarizer system and the one or more tensile coupons on the build plate at an elevated temperature for a first period of time to form a solid solution of magnesium and silicon in the aluminum alloy followed by aging at a lower temperature than the elevated temperature for a second period of time to form ordered arrays of atoms in the aluminum alloy;

removing the tensile coupons from the build plate and the monolithic choke ring horn antenna and the septum polarizer system;

coating nickel onto surfaces of the monolithic choke ring horn antenna and of the septum polarizer system at a thickness to reduce surface roughness; and coating gold onto the nickel coating at a thickness to reduce radiofrequency loss when in use.

12. The process of claim 11, wherein removing the tensile coupons by a wire electrical discharge machining.

13. The process of claim 11, further comprising coating nickel onto surfaces of the tensile coupons at the thickness to reduce surface roughness for the surfaces of the monolithic choke ring horn antenna and the septum polarizer system.

* * * * *